Feb. 17, 1953  J. H. O'BRIEN  2,628,806
CLAMP
Filed Dec. 14, 1946

INVENTOR
JERRY H. O'BRIEN
BY Charles R Werner
ATTORNEY

Patented Feb. 17, 1953

2,628,806

UNITED STATES PATENT OFFICE 2,628,806

CLAMP

Jerry H. O'Brien, Wichita, Kans.

Application December 14, 1946, Serial No. 716,260

1 Claim. (Cl. 248—226)

This invention relates in general to clamps and in particular to a clamping device for attaching accessories to the doors of motor vehicles.

Auxiliary devices on motor vehicles such as mirrors, awnings and the like are very susceptible to theft unless rendered difficult to remove; and it is the primary object of my invention to provide a clamp which will render virtually theftproof any device which it supports.

It is another object of the invention to provide a clamp employing securing means accessible only when the vehicle door is open.

It is a further object of the invention to provide a clamp impervious to loosening by vibration.

It is still another object of the invention to provide a clamp with components so arranged as to provide free access for the securing of the accessory or hanger supported by the clamp.

And it is another object of my invention to provide a recessed portion on the clamp to receive the means which secure the clamp to the object or hanger arm which it supports, whereby said means will not interfere with the mounting of the clamp and a maximum bearing surface will be provided for attaching to the vehicle door.

One other object of the invention is to provide a clamp, small in size and strong and efficient in construction, so that it will not mar the beauty and neat appearance of the vehicle on which it is mounted and yet will be sturdy enough to securely hold any object which it supports.

Other objects and advantages as well as the construction and use of my invention will be apparent by reference to the following specification in connection with the accompanying drawings in which.

Figure 1:
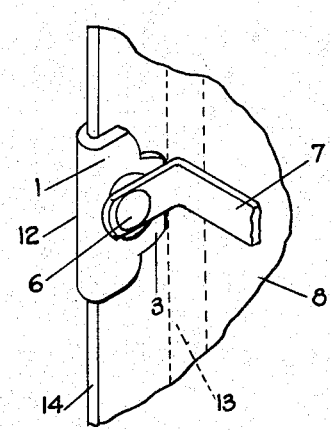
Fig. 1 is an isometric, elevational view of my clamp showing fragmentary portions of the door and the arm or hanger supported by the clamp, looking at the outside of the vehicle door.
Figure 2:
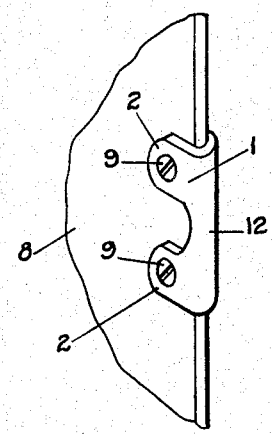
Fig. 2 is a view similar to Fig. 1, except that the inside surface of the door is shown.

Referring now to the drawings by numerals of reference I designates the clamp body, substantially U-shaped in cross section, one leg of the U having a pair of lugs or ears 2 and the other leg 3 of the U being centrally disposed opposite the ears 2.

Leg 3 is provided with recess 4 in which may be received the head 5 of fastener 6 employed to securely hold arm or bracket 7 to the clamp. The fastener 6 may be a rivet, bolt or any similar fastening device and the arm or bracket 7 may be an integral part of any accessory which it is desired to mount on the vehicle. It should be noted that when the fastener 6 is in securing position, the head 5 is entirely contained in recess 4 and does not interfere with the mounting of the clamp to the vehicle door 8.

One important feature of the invention is the spacing of the lugs or ears 2 and the positioning of leg 3 therebetween and oppositely thereof. This provides ready access for the necessary tools to securely drive home the fastening means 6 with no interference or restriction by other components of the clamp. By this construction the clamp can be entirely formed before securing to the arm or bracket 7, thereby greatly facilitating manufacture.

Lock or set screws 9 are provided in threaded openings 10 in each ear 2 and are adapted to be screwed up tightly for securely holding the clamp to the vehicle door. A fabric pad 11 is provided between the door and the leg 3 after the bracket 7 is secured.

It should be noted that the set screws 9 and the recess 4 are as close as possible to the edge 12 of the U-shaped clamp. It has been found in actual practice that some vehicles have a bead 13, as shown in dotted lines in Fig. 1, which would normally interfere with a clamping device unless it was so constructed to bear against the portion of the door between the bead 13 and the edge 14 of said door. Leg 3 is somewhat elongated in form and squared away as at 15 to provide a a maximum amount of bearing surface and yet clear the bead 13.

Figure 3:
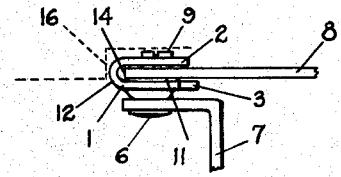
Fig. 3 is a top elevational view of the clamp attached to the door.
Figure 4:
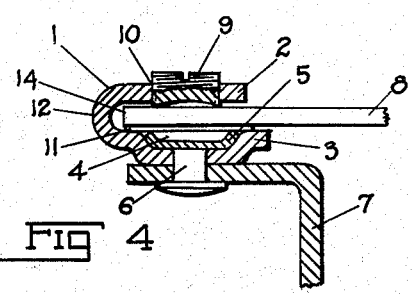
Fig. 4 is an enlarged, sectional view on the line 4—4 of Fig. 5, parts being shown in elevation.
Figure 5:
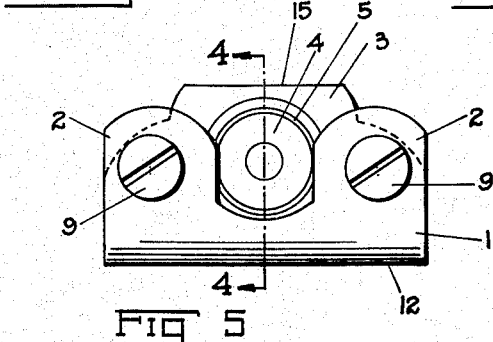
Fig. 5 is an enlarged elevational view of the clamp.

As will be noted from the illustrations the set screws 9 are accessible only when the vehicle door is open. Therefore, with the door locked, the accessory which is carried by the clamp cannot be removed except by force. With the set screws 9 securely turned up to bear against the door 8, there is no danger of the clamp becoming loose by vibration or other cause as the inherent resiliency of the clamp material will prevent the screws from turning accidentally. However, should the clamp be inadvertently loosely mounted, the clamp and accessory could not be lost while the door is closed as the clamp is held between the door 8 and the door frame 16, as seen in Fig. 3.

It is apparent from the foregoing that I have provided a small, yet efficient and easily constructed and mountable clamp, substantially theftproof and vibrationproof. Changes in form, proportion and details of construction may be resorted to without departing from the spirit of my invention and I reserve all rights to such changes as come within the scope of these specifications and the claim which follows.

What I claim as new and desire to secure by Letters Patent is:

In a clamp of the class described for use on the flange of a vehicle door, a substantially U-shaped body having legs fitting closely against the vehicle door flange, clamp securing means on the leg of the U inside the door and substantially flush with said leg, and accessory mounting means on the other leg of the U, an offset portion on the leg to which the accessory mounting means are secured, said offset portion forming a boss and a recess, said accessory mounting means comprising a bracket abutting the boss, a rivet passing through the bracket and the boss, one end of the rivet being expanded in the recess.

JERRY H. O'BRIEN.

REFERENCES CITED

The following references are of record in the file of this patent:

UNITED STATES PATENTS

| Number | Name | Date |
|---|---|---|
| 296,152 | Fair | Apr. 1, 1884 |
| 990,856 | Freiberg | May 2, 1911 |
| 1,330,814 | Meyer | Feb. 17, 1920 |